United States Patent [19]
Asplin

[11] Patent Number: 5,524,869
[45] Date of Patent: Jun. 11, 1996

[54] OVERLASH JIG

[76] Inventor: William A. Asplin, 6162 Ridgewood SW., Canton, Ohio 44706

[21] Appl. No.: 335,155

[22] Filed: Nov. 7, 1994

[51] Int. Cl.⁶ .................................................. E21C 29/16
[52] U.S. Cl. ............................................... 254/134.3 CL
[58] Field of Search ................... 254/134.3 R, 134.3 PA, 254/134.3 CL

[56] References Cited

U.S. PATENT DOCUMENTS

| | | |
|---|---|---|
| 2,613,257 | 10/1952 | Wollet . |
| 3,134,575 | 5/1964 | Walter . |
| 3,596,878 | 8/1971 | Parsen . |
| 3,672,636 | 6/1972 | Parsen . |
| 3,861,650 | 1/1975 | Jackson . |
| 5,040,771 | 8/1991 | Spell . |

*Primary Examiner*—Robert C. Watson
*Attorney, Agent, or Firm*—Sand & Sebolt

[57] ABSTRACT

An overflash jig for pulling a cable along a support line via a tow rope such that when the tow rope is slack, the overlash jig does not retreat along the support line thereby slacking the cable. The jig includes a body having a pair of side plates and a pair of rollers rotatably mounted therebetween for engaging the support line. The overlash jig also includes fixed and movable brake shoes for frictionally engaging the support line and a coil spring for urging the movable brake shoe toward the support line. A plurality of pulleys interact with a rope attached to the tow rope to compress the coil spring when tension is applied to the rope. As the spring is depressed, the movable brake shoe moves away from the support line, and the overlash jig may be pulled along the support line. The tow rope may also be detached from the pulleys and attached to the body to apply tension to the cable while the overlash jig is maneuvered around an obstacle, such as a utility pole. Inasmuch as the support line is trapped between the fixed brake shoe, movable brake shoe, and side plates, the movable brake shoe is completely removed from the overlash jig to permit the overlash jig to be removed from the support line.

21 Claims, 14 Drawing Sheets

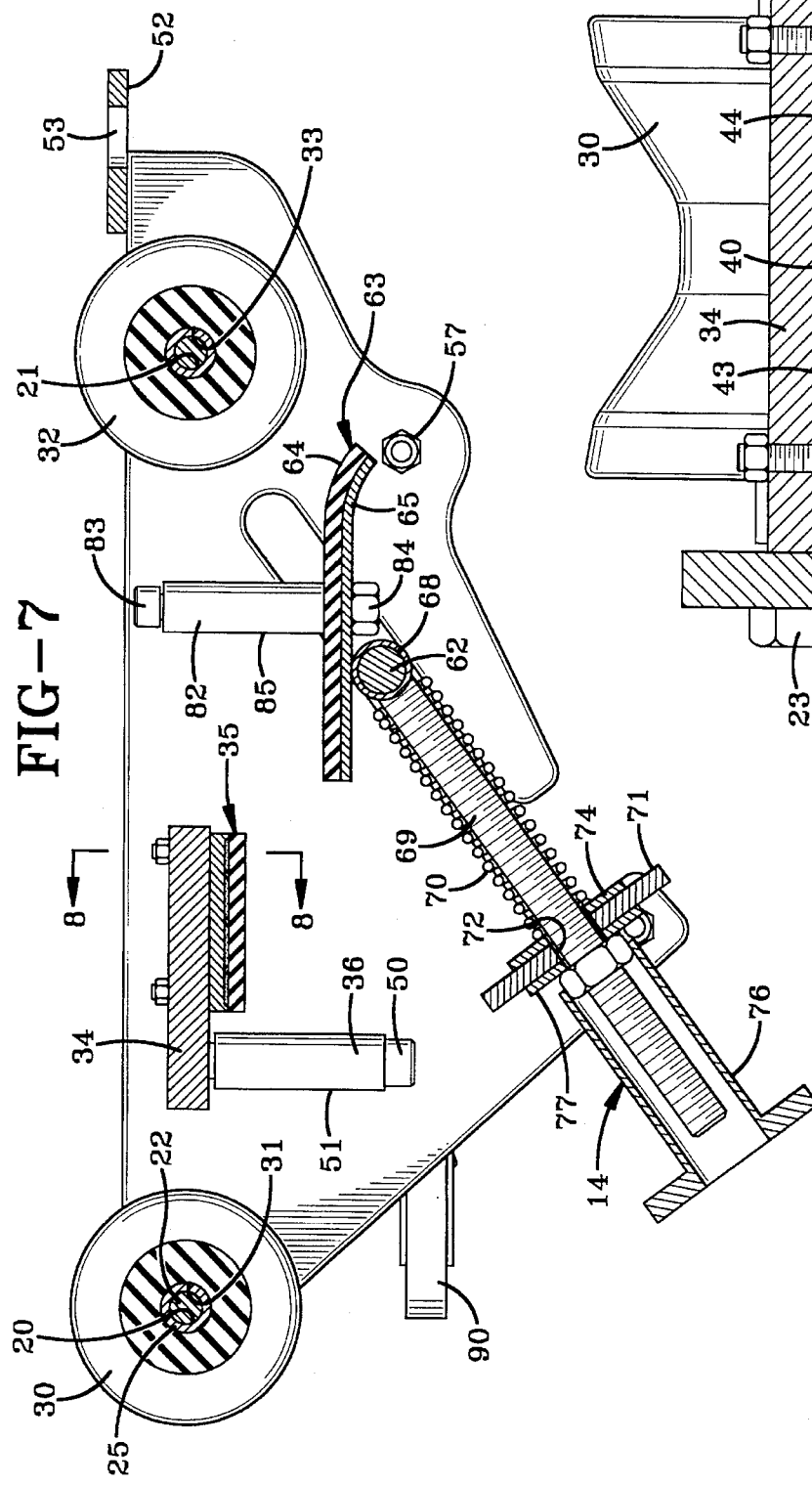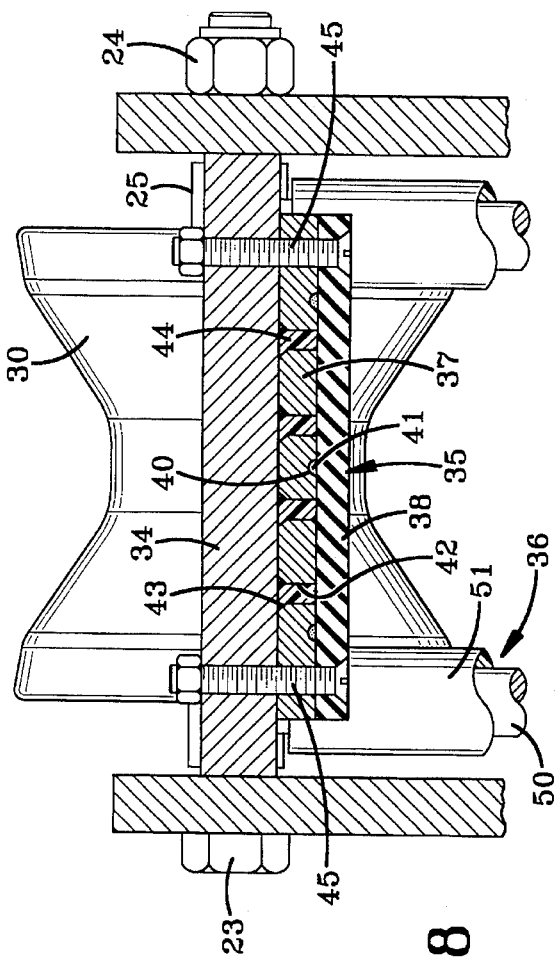

OVERLASH JIG

BACKGROUND OF THE INVENTION

1. Technical Field

The present invention relates generally to an improved overlash jig. More particularly, the invention relates to a device for pulling a cable along a support line of the type supported between utility poles. Specifically, the invention relates to a device for pulling a cable along a support line which retains tension on the cable even as the cable is maneuvered around a utility pole.

2. Background Information

Utility poles often support high-voltage power lines, cables for transmitting cable television, and telephone lines. Generally, utility poles are owned by a single power company, and the power company charges other utility companies an annual fee for stringing cables on poles which it owns. For example, a given utility company may pay the power company an annual fee for each pole connection necessary to support its cables.

When new cables are installed on utility poles, they must be of sufficient strength and rigidity to withstand wind and weather, as well as to support the weight of the cable as it is suspended from the utility poles.

As both rural and urban areas continue to expand, the need to string additional cables on existing utility poles also continues to grow. This is especially true given the increased popularity of cable television. To avoid pole connection expenses, it is becoming increasingly common to lash new cables to cables already positioned on and connected to utility poles. Special tools are available that travel along the existing line and play out a lashing wire that spirals around the new cable to lash it to an existing line.

The lashing of new cables onto existing lines also permits a less rigid, and consequently less expensive, cable to be utilized. Specifically, the existing line is closely lashed to the new cable, and as such, the new cable is not required to support its own weight as the existing line will carry a portion of that load. As such, the lashing of new cables onto existing cables is significantly less expensive than the alternative of stringing independent cables on utility poles.

Heretofore, a number of overlash jigs have been developed which are presumably sufficient for the purpose for which they are intended. In operation, a cable that is to be pulled along an existing support line is first attached to the overlash jig. The overlash jig is then supported via a plurality of rollers on the support cable. The jig is then towed via a tow vehicle so that the jig rolls along the support line pulling the new cable at the same speed the vehicle is moving.

When the overlash jig encounters an obstacle such as a tree, mid-span drop, or more commonly, a utility pole, the vehicle is stopped and the tow rope disconnected from the jig. An effort has been made to hold the new cable in position on the support line, while the obstacle is circumvented. The free end of the tow rope is then brought around, or under, the obstacle as conditions require, and is reconnected to the jig so that the vehicle can resume its forward travel, again towing the jig and hence pulling the new cable. When the reconnection has been made, the means holding the new cable in position is released.

One of the drawbacks of the above-described process is the lack of any suitable device or system for holding the new cable in position while the tow rope is released from the overlash jig. If the new cable has been pulled a very short distance when the obstacle is encountered, one person can retain the cable in position. However, if the cable has already been pulled a significant distance, then the force exerted on the cable will be significant, and the user must find another means of holding the cable in position as the overlash jig is moved around the obstacle.

A variety of clamps have been developed which are presumably adequate for the purpose for which they are intended. These clamps attempt to clamp the cable to the support line to prevent the cable from retreating therealong. If the cable does retreat along the support line, it will slack and sag, possibly blocking driveways, roads and parking lots.

One problem inherent with prior retaining clamps is that the use thereof is labor intensive as the clamps are time consuming to apply and remove. Further, if a cable has been pulled a significant distance, the cable weight may be sufficient to cause the clamp to slip, and the cable will slacken unless the clamp is further tightened. Such further tightening, while sufficient to hold the cable in position, may damage one or both of the cable or support line.

U.S. Pat. No. 5,040,771 attempted to overcome a number of the problems associated with the above-discussed clamps by including a brake mechanism in the overlash jig. While the overlash jig of the '771 patent is presumably adequate for the purpose for which it was intended, it still does not provide an effective braking mechanism, and may inadvertently be pulled from the support line when in use. Moreover, once the tow rope of the '771 patent is relaxed and the brake system applied to the support line, the brake system cannot be manually disengaged to remove the overlash jig from the support line, substantially reducing the effectiveness of the unit.

Thus, the need exists for an overlash jig which is retained on the support line and which secures the support line within the overlash jig. Moreover, the need exists for an overlash jig which provides an effective braking and guiding mechanism, and wherein the braking mechanism may be manually disengaged without the need for reapplying tension to the tow line attached thereto.

SUMMARY OF THE INVENTION

Objectives of the invention include providing an overlash jig which safely secures the support line within the overlash jig.

A further objective includes providing such an overlash jig which includes a braking mechanism to secure the cable in position relative to the support line and prevent the cable's retreat along the support line.

Another objective of the invention is to provide an overlash jig which provides a braking mechanism which both frictionally engages and kinks the support line to effectively brake the overlash jig on the support line.

Another objective is to provide such an overlash jig in which the braking system may be manually overridden such that the overlash jig may be removed from the support line and maneuvered around an obstacle while the tow line retains pressure on the overlash jig via a second interconnection therebetween.

A further objective is to provide such an overlash jig wherein the brake pads are easily replaced.

A still further objective is to provide such an overlash jig which is shaped to ease its passage through tree limbs and the like.

Yet another objective of the invention is to provide such an overlash jig which is manufactured of sturdy, lightweight materials.

A further objective of the invention is to provide an overlash jig which is of a relatively simple construction, which achieves the stated objectives in a simple, effective and inexpensive manner, and which solves problems and satisfies needs existing in the art.

These and other objectives and advantages of the invention are obtained by the overlash jig of the present invention, the general nature of which may be stated as including a body; a plurality of rollers carried by said body; a fixed brake shoe carried by said body; a movable brake shoe spaced apart from said fixed brake shoe; spring means for biasing said movable brake shoe toward the support line when passing between said movable brake shoe and said fixed brake shoe; manual brake release means for overcoming said spring means and for moving said movable brake shoe away from the cable; and brake operating means for overcoming said spring means and moving said movable brake shoe away from the support line when the cable is being pulled along the support line.

BRIEF DESCRIPTION OF THE DRAWINGS

A preferred embodiment of the invention, illustrative of the best mode in which applicant has contemplated applying the principles, is set forth in the following description and is shown in the drawings, and is particularly and distinctly pointed out and set forth in the appended claims.

FIG. 7 is a cross-sectional view of the device taken substantially along line 7—7, FIG. 3;

FIG. 8 is an enlarged fragmentary cross-sectional view of the overlash jig, taken substantially along line 8—8, FIG. 7;

Similar numerals refer to similar parts throughout the drawings.

DESCRIPTION OF THE PREFERRED EMBODIMENT

Figure 1:
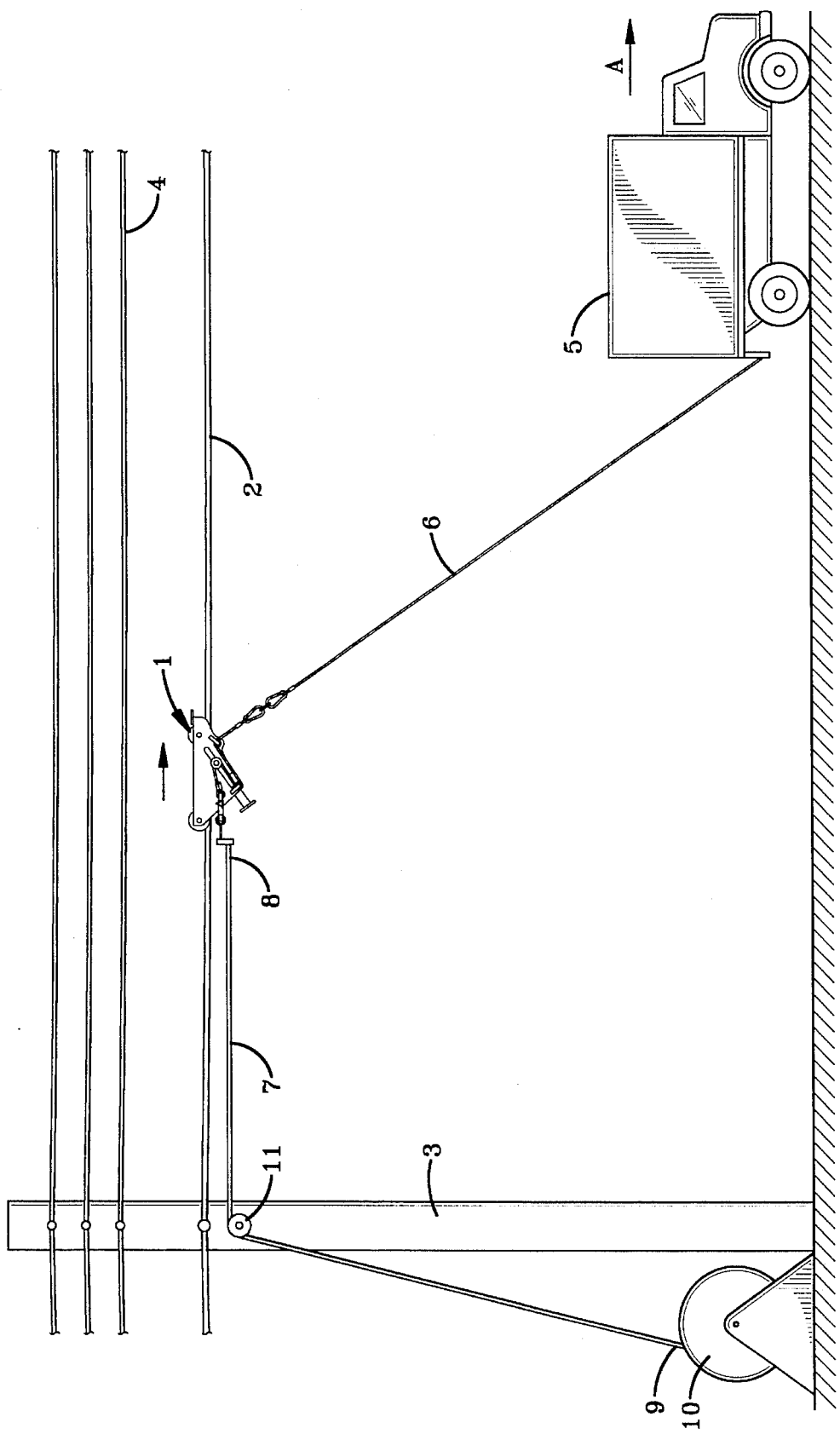
FIG. 1 is a diagrammatic elevational view of the overlash jig of the present invention shown attached to a vehicle supported from a support line and towing a cable.

The overlash jig of the present invention is indicated generally at 1, and is shown specifically in FIG. 1 supported from a support line 2. Support line 2 is generally horizontal and extends between vertical utility poles 3 (one shown), along with other lines such as power lines, telephone lines and cable television cables 4. Overlash jig 1 is shown attached to a vehicle 5 via a tow rope 6. A cable 7 has a first end 8 attached to overlash jig 1, and a second end 9 wound about a cable spool 10. A pulley 11 is attached to utility pole 3 adajcent cable spool 10 to assure that cable 7 is pulled relatively parallel to support line 2. In operation, as vehicle 5 moves in the direction of arrow A, overlash jig 1 is pulled over support line 2 via tow rope 6, and connected cable 7 is unwound from cable spool 10 and pulled along the length of support line 2.

Figure 2:
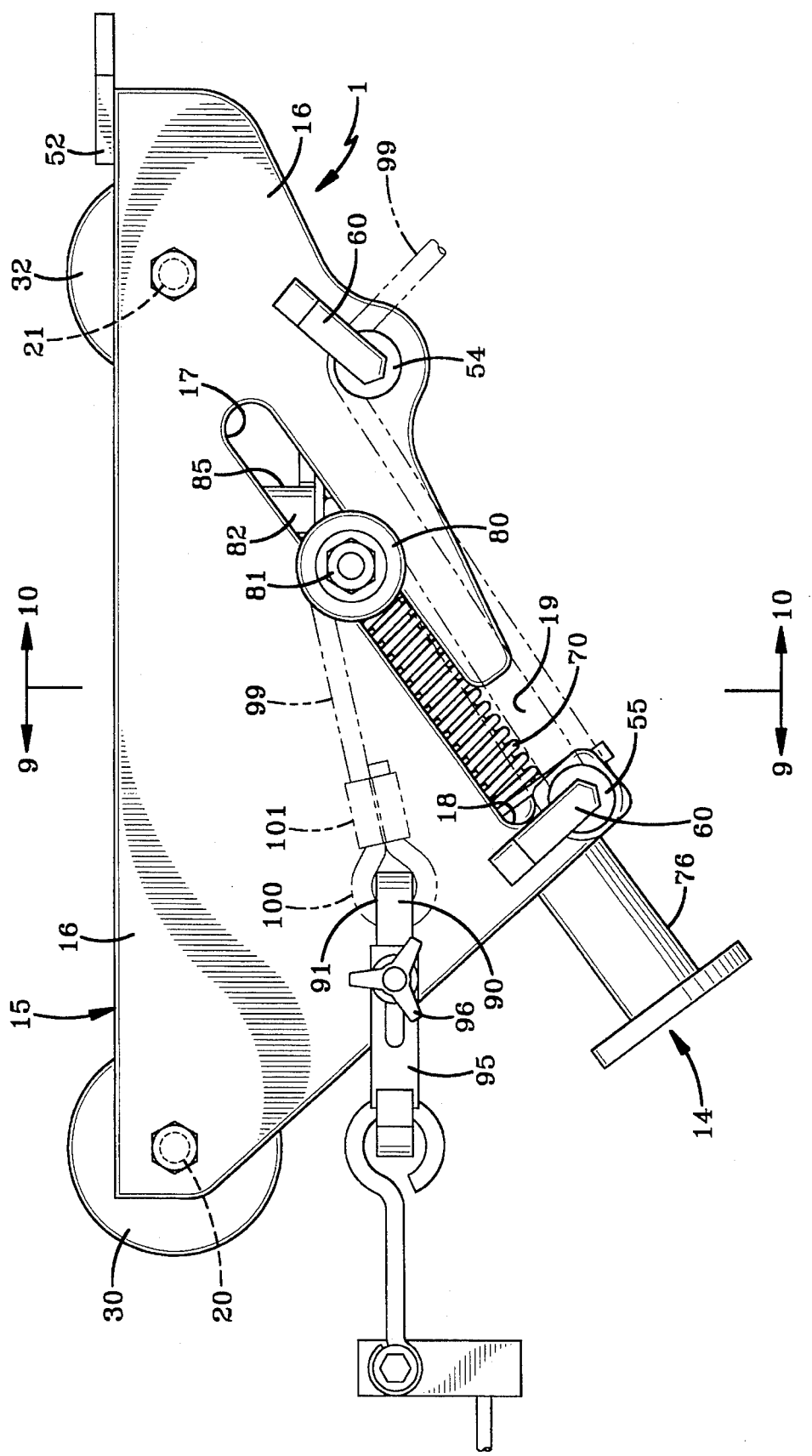
FIG. 2 is a side elevational view of the overlash jig with portions of the rope shown in dot-dash lines.
Figure 3:
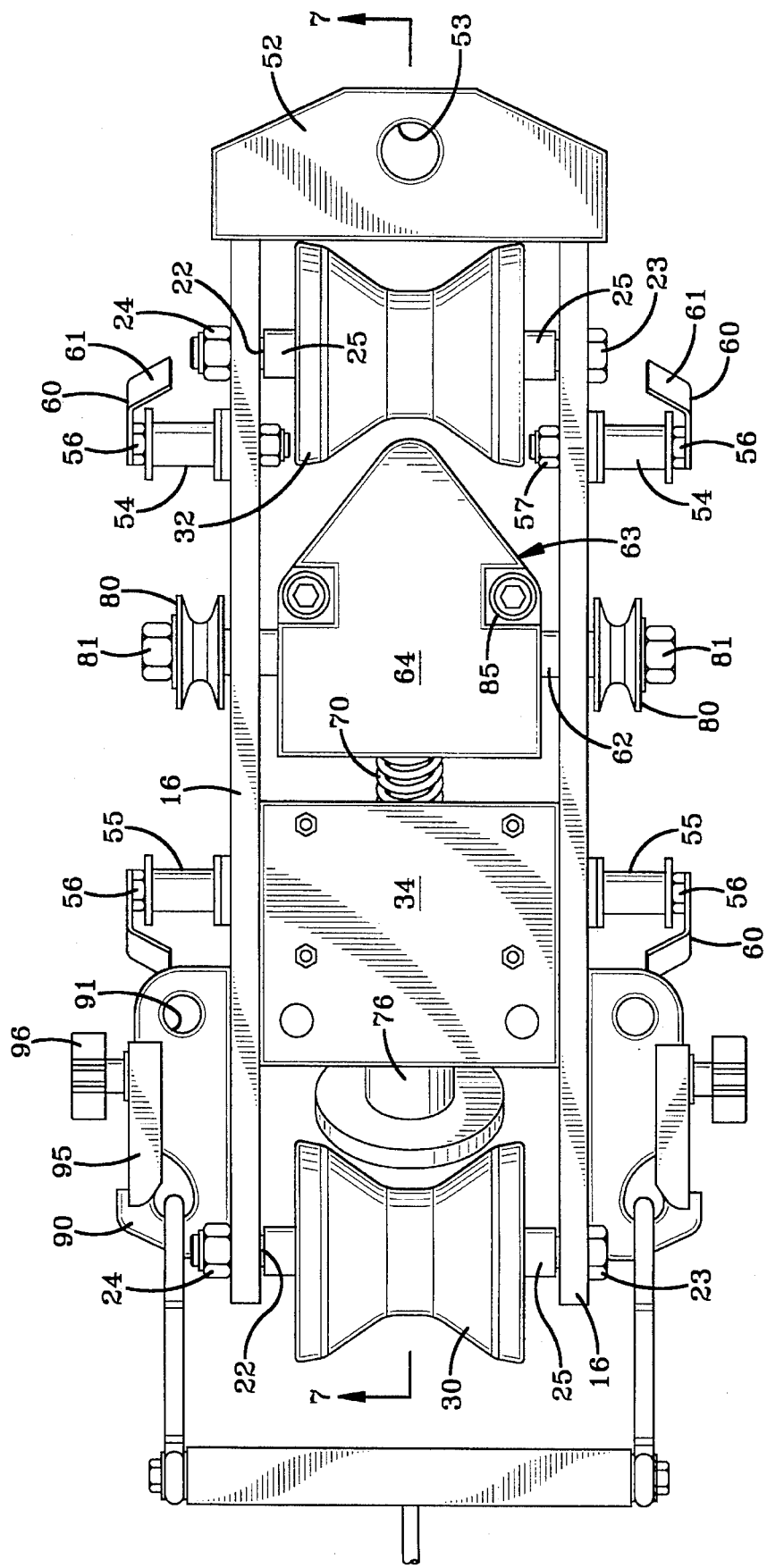
FIG. 3 is a top plan view of the overlash jig of FIG. 2 with the rope removed.

Referring specifically to FIGS. 2–10, overlash jig 1 includes a manual brake release 14 and a body 15 having a pair of parallel and spaced apart side plates 16. While side plate 16 may take a variety of configurations, they are generally triangularly shaped in the preferred embodiment. Each side plate 16 is formed with a guide slot 17, an upper end of which forms a recess 18. Each guide slot 17 and recess 18 opens at an opening 19. Each side plate 16 also includes one of a pair of axially aligned rear holes 20 and one of a pair of axially aligned forward holes 21. An axle 22 (FIG. 3) extends through each of holes 20 and 21, and each axle 22 includes a bolt 23 and an associated nut 24. Each axle 22 also includes a sleeve 25 rotatably mounted on bolt 23 and intermediate side plates 16 (FIG. 3). A rear roller 30 is formed with a central aperture 31 and is interference fitted over a sleeve 25 for rotation about axle 22 extending through rear holes 20. Similarly, a front roller 32 is formed with a central aperture 33 and is interference fitted over a sleeve 25 for rotation about axle 22 extending through forward holes 21.

Figure 4:
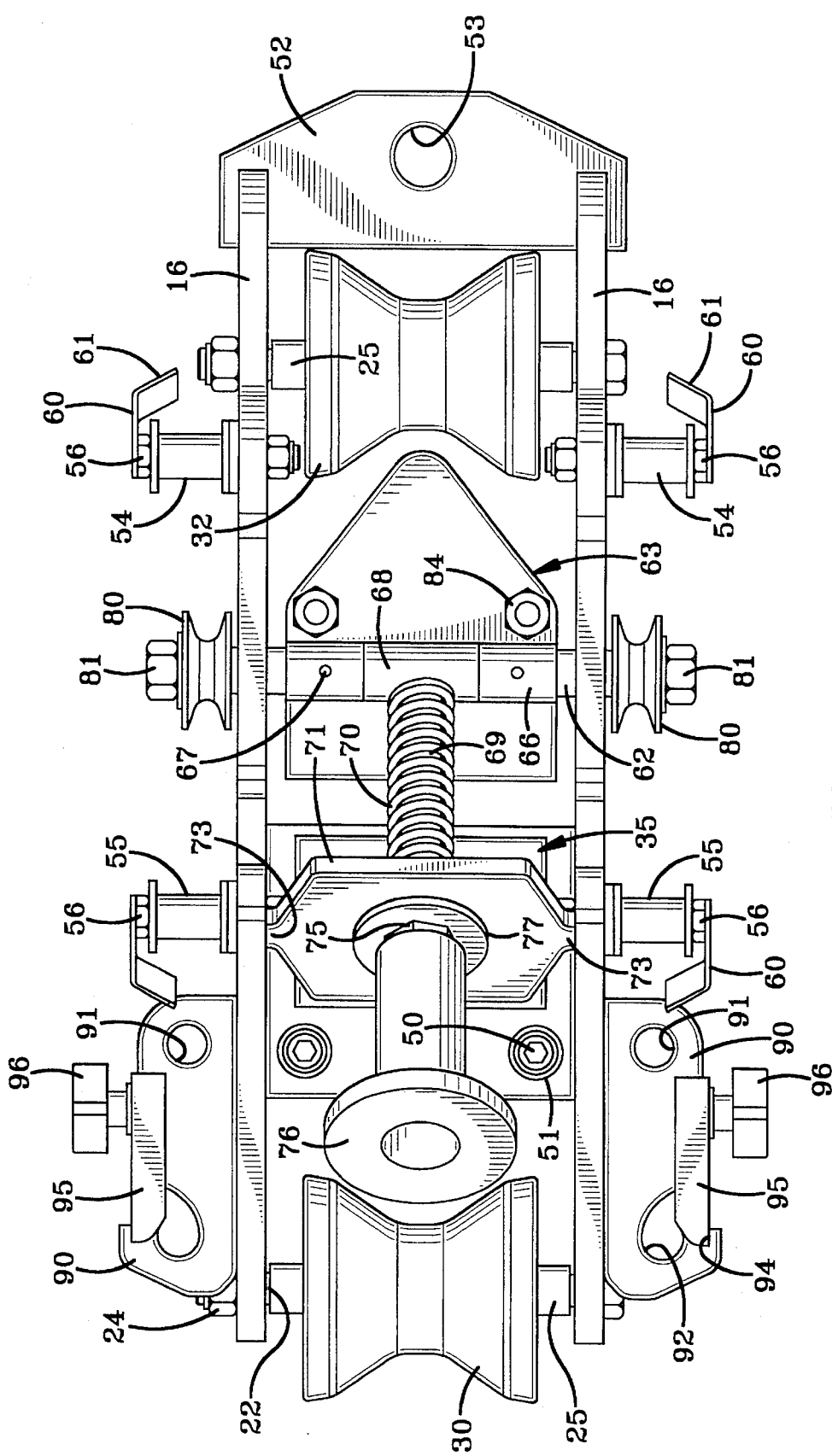
FIG. 4 is a bottom view of the overlash jig of FIG. 3.
Figure 5:
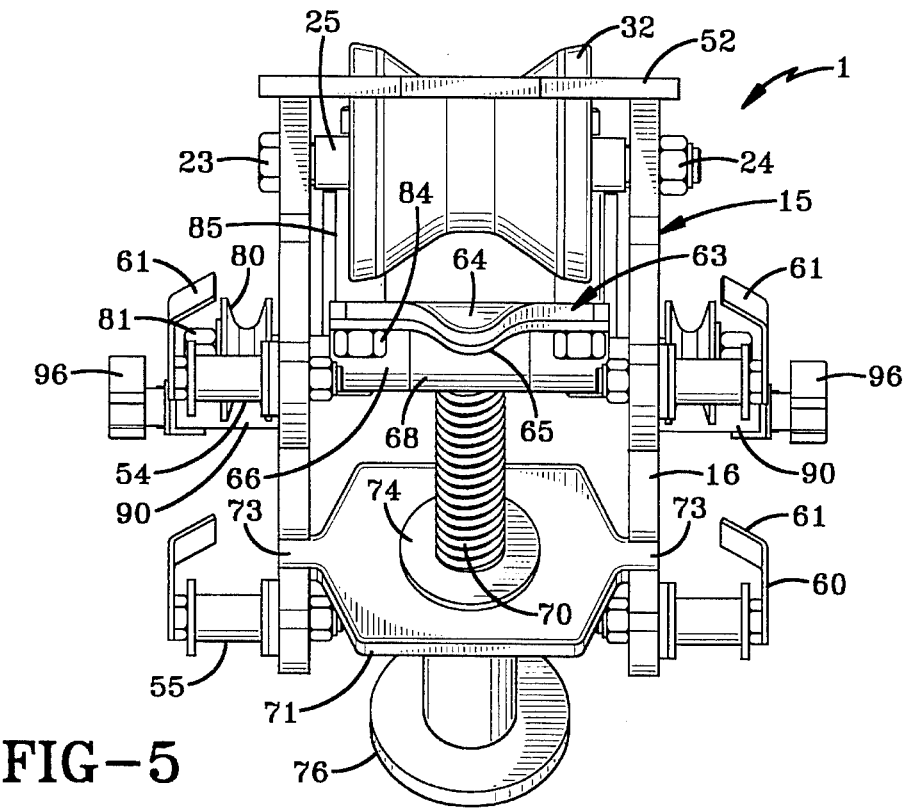
FIG. 5 is a front view of the overlash jig of FIG. 3.
Figure 6:
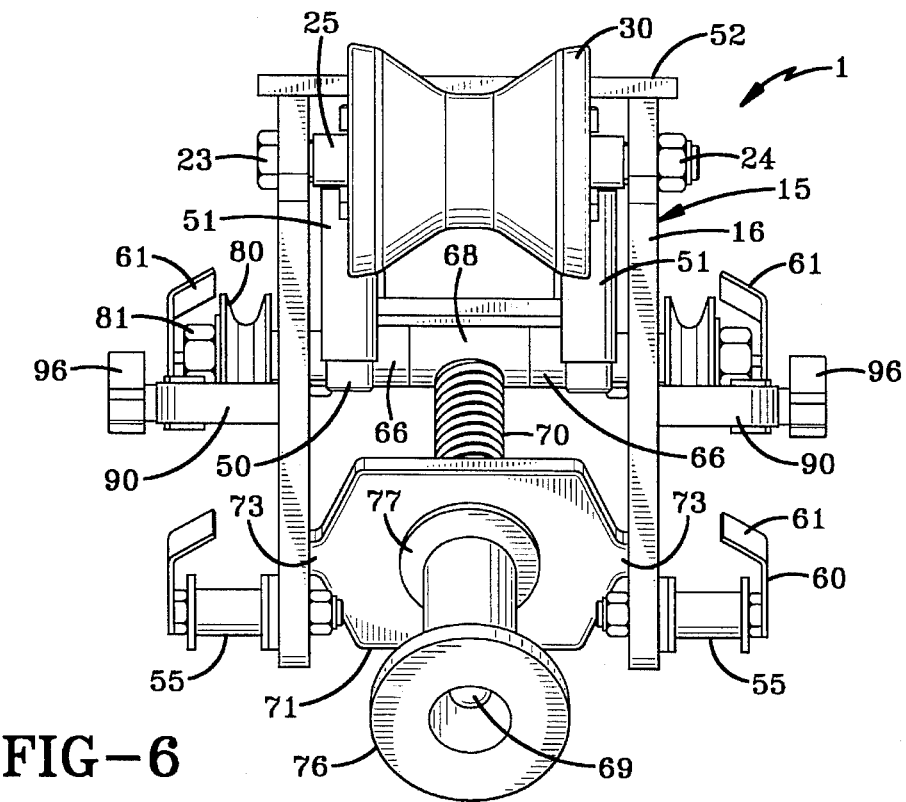
FIG. 6 is a rear view of the overlash jig of FIG. 3.
Figure 9:
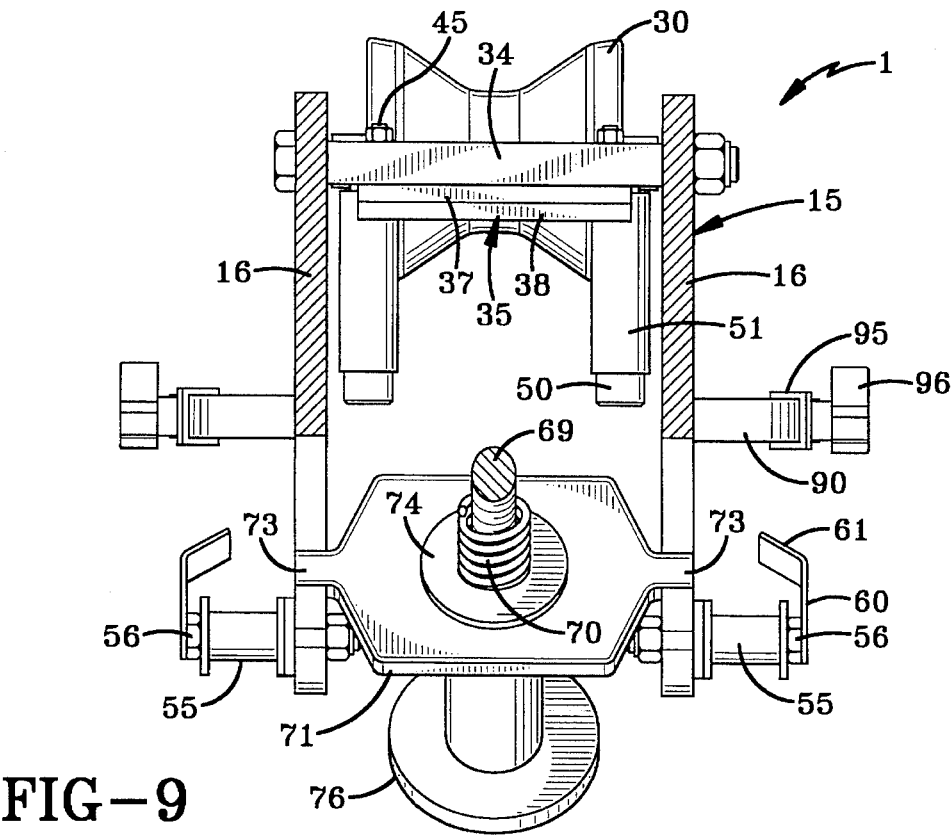
FIG. 9 is a cross-sectional view of the overlash jig taken along line 9—9, FIG. 2.
Figure 10:
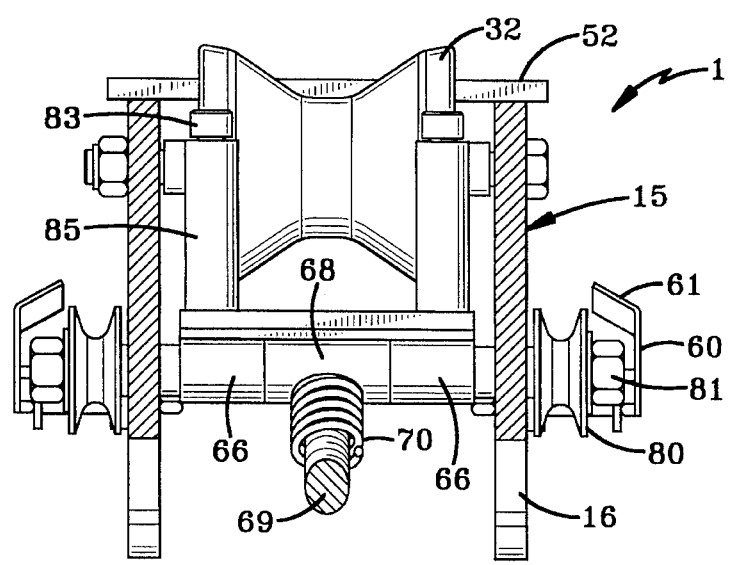
FIG. 10 is a cross-sectional view of the overlash jig taken along line 10—10, FIG. 2.

A rectangular mounting plate 34 is welded between side plates 16 and is substantially orthogonal thereto. A fixed brake shoe 35 and a pair of rear cable guides 36 are mounted on mounting plate 34 (FIGS. 4 and 7).

Referring specifically to FIG. 8, fixed brake shoe 35 includes a base plate 37 and a brake pad 38. Base plate 37 includes score lines 40 for receiving an adhesive 41 to secure brake pad 38 to base plate 37. Moreover, base plate 37 includes a number of holes 42 having countersunk portions 43 for receiving liquid adhesive. As the liquid adhesive cures, plastic rivets 44 are formed which extend through holes 42 and countersunk portions 43 which are adhesively connected to brake pad 38. Fixed brake shoe 35 is then bolted to mounting plate 34 via a plurality of bolts 45.

Each rear cable guide 36 includes a vertically mounted and downwardly extending hex bolt 50 and a cylindrical roller 51 rotatably mounted thereon. Cylindrical rollers 51 are of a diameter sufficient to permit free rotation about hex bolt 50, and have an inside diameter smaller than that of the head of hex bolt 50 to assure that cylindrical roller 51 is retained on hex bolt 50.

A tow plate 52 is formed with a hole 53 and is welded to each of the side plates 16 adjacent front roller 32 but on the opposite side thereof with respect to mounting plate 34. While side plates 16, mounting plate 34 and tow plate 52 may be manufactured of a variety of materials without departing from the spirit of the present invention, lightweight high strength aluminum is envisioned in the preferred embodiment as overlash jig 1 is often used by individuals awkwardly positioned and supported from utility pole 3.

Still referring to FIGS. 2–10, and specifically to FIGS. 2–3, each side plate 16 has a first pulley 54 and a second pulley 55 extending outwardly therefrom. Each pulley 54 and 55 is mounted to a respective side plate 16 via a bolt 56. Preferably, each bolt 56 is mounted to a respective side plate 16 via a nut 57. A sheet metal finger 60 is mounted on each bolt 56 and includes an end 61 bent inwardly toward a corresponding side plate 16, and partially over the respective pulley 54 and 55 for purposes to be described in detail hereinbelow.

In accordance with one of the main features of the invention, manual brake release 14 includes a pin 62 of a length sufficient to extend through guide slots 17 (FIGS. 4–7). A nut 81 threadably engages each end of pin 62. A movable brake shoe 63 is mounted on pin 62 and includes a brake pad 64 and a base plate 65. A number of axially aligned and spaced apart cylindrical mounting brackets 66 are fixedly attached to base plate 65 and have an inside diameter sufficient to receive pin 62. A pin 67 extends through each cylindrical mounting bracket 66 to secure movable brake shoe 63 to pin 62 and prevent rotational and sliding movement therebetween. A leading end of movable brake shoe 63 is turned downwardly to assure that the brake shoe does not gouge support line 2 as overlash jig 1 is towed therealong.

A cylindrical sleeve 68 having a diameter substantially equal to that of cylindrical mounting brackets 66 is interposed therebetween, and is rotatably mounted on pin 62 (FIG. 7). A threaded bolt 69 is welded to sleeve 68, and has a longitudinal axis substantially perpendicular to a longitudinal axis of sleeve 68. A compression coil spring 70 is slidably received over bolt 69 and includes a first end abutting sleeve 68 and a second end supporting a pressure plate 71. Pressure plate 71 includes a central hole 72 (FIG. 7) for slidably receiving bolt 69 and a pair of arms 73 extending outwardly from the sides of pressure plate 71. Arms 73 are of a size and shape sufficient to pass through opening 19 and seat in respective recesses 19. A first washer 74 is interposed between coil spring 70 and pressure plate 71 such that coil spring 70 is interposed between sleeve 68 rotatably mounted on pin 62 and washer 74 adjacent pressure plate 71. A nut threadably engages bolt 69 and is positioned on the opposite side of pressure plate 71 as washer 74 and coil spring 70. A handle 76 is welded to nut 75 to provide easy manual rotation of nut 75 toward and away from pressure plate 71. A washer 77 is interposed between nut 75 and pressure plate 71. Washers 77 and 74 prevent pressure plate 71 from wearing, and operate to distribute the load evenly about pressure plate 71.

Thus, as handle 76 is rotated in a clockwise direction, pressure plate 71 will be moved toward movable brake shoe 63, compressing coil spring 70. Similarly, if handle 76 is rotated in a counterclockwise direction, pressure plate 71 will be urged away from movable brake shoe 63 via the force exerted by coil spring 70 for purposes which will be described in detail hereinbelow.

A pulley 80 is mounted on each end of pin 62 exterior of and adjacent to side plates 16. Pulleys 80 are rotatably mounted on pin 62 and are retained thereon via nuts 81 which threadably engage each end of pin 62 and prevent movement of pulleys 80 along the longitudinal direction of pin 62.

Movable brake shoe 63 further includes a pair of parallel and spaced apart upwardly extending front cable guides 82. Each cable guide 82 includes a hex bolt 83 extending through brake pad 64 and base plate 65, the end of which is threadably engaged by a nut 84. A roller 85 is then rotatably mounted on each hex bolt 83 and is retained thereon via the head of hex bolt 83 just as described with respect to rear cable guides 36.

Figure 11:
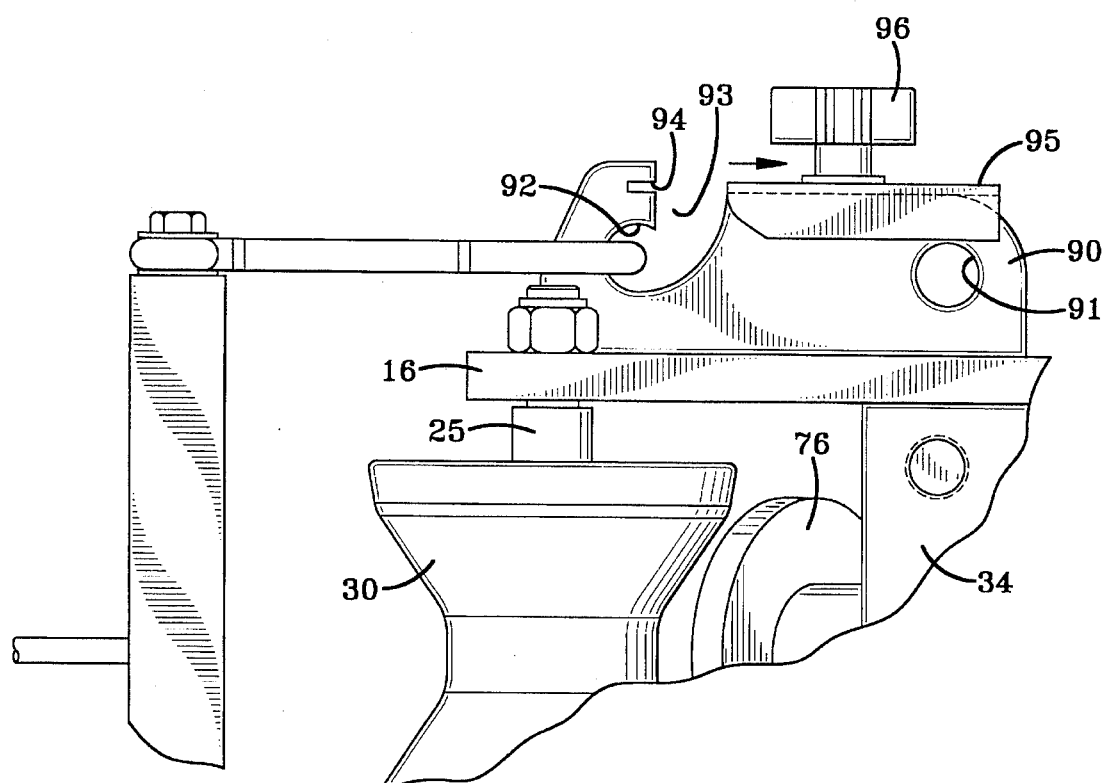
FIG. 11 is an enlarged fragmentary view of a portion of the overlash jig shown in FIG. 2 showing the cable harness latch in open position.

Each side plate 16 also includes a cable harness latch 90 welded to each side plate 16 toward the rear thereof adjacent rear roller 30 (FIGS. 3 and 11). Each cable harness latch 90 includes a through hole 91 and a hook-shaped recess 92 having an opening 93. Cable harness latch 90 further includes a milled slot 94 for receiving a sliding gate 95 movable between the closed position shown in FIG. 4 and the open position shown in FIG. 11. One gate 95 is mounted to each cable harness latch 90 via a thumbscrew 96 which may be tightened to secure gate 95 in either the open or closed position. A harness 88 (FIG. 3) is positioned within each hook-shaped recess 92 and is secured therein via sliding gate 95.

Referring to FIG. 2, a flexible linear member, or rope 99 (shown in dot-dash lines) passes through hole 91 and a loop 100 is created in said rope via rope clamp 101. Rope 99 is securely fastened within hole 91 of cable harness latch 90 and extends toward pulley 80 rotatably mounted on pin 62 of manual brake release 14. Once rope 99 passes around pulley 80, it extends in the direction of pulley 55 and is also wrapped therearound. Rope 99 then passes over pulley 54 and is attached to tow line 6, as is shown specifically in FIGS. 1 and 12. As should be apparent to one of ordinary skill in the art, inwardly bent fingers 60 assure that ropes 99 remain in contact with associated pulleys 54 and 55 and is not inadvertently pulled thereoff.

Figure 12:
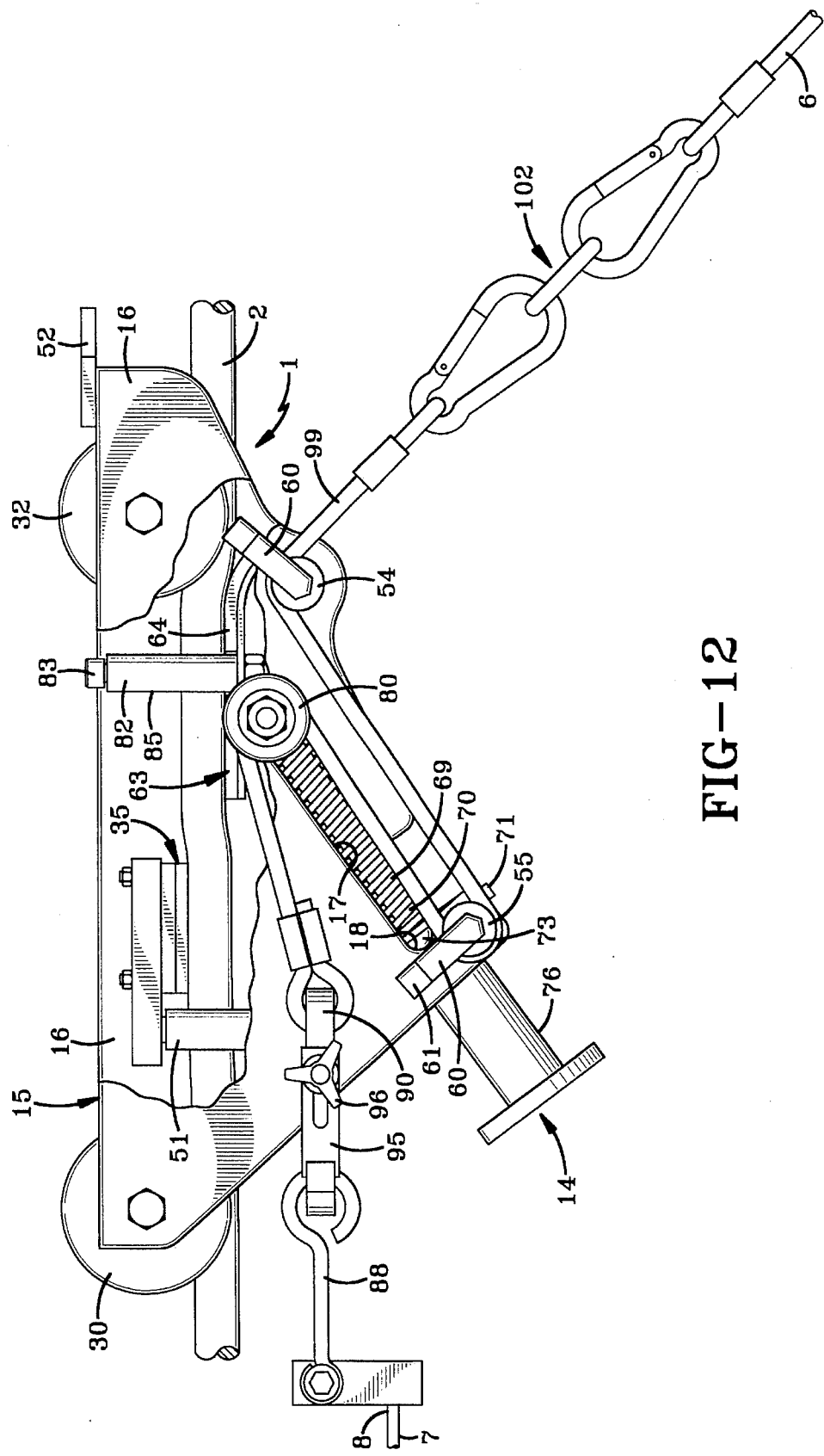
FIG. 12 is a side elevational view of the overlash jig shown with portions cut away, suspended from a support line and attached to a relaxed tow line.

Turning then to the operation of overlash jig 1, and specifically to FIG. 12, jig 1 is shown supported from the support line 2, and includes a cable harness 88 attached to cable 7. Tow cable 6 is attached to rope 99 via the clip and ring arrangement 102 shown extending therebetween and which is well known in the art. Movable brake shoe 63 is shown engaging support line 2 and tow cable 6 is slack. The position of overlash jig 1 shown in FIG. 12 is indicative of the position when overlash jig 1 is at rest, either just after it has been installed on a support line 2, or just after line 6 has been slackened to permit the removal of overlash jig 1 for movement around an obstacle such as a utility pole. In this position, coil spring 70 is applying pressure against pressure plate 71 such that arms 73 are fully contacting respective recesses 18 to prevent the upward travel of pressure plate 71 along bolt 69. Similarly, coil spring 70 is providing pressure against movable brake shoe 63 to frictionally engage support line 2. Coil spring 70 is sufficiently prestressed such that the length of coil spring 70 in this position is sufficiently far from the spring's relaxed position to provide sufficient force to maintain a frictional engagement between support line 2, movable brake shoe 63 and fixed brake shoe 35. Coil spring 70 also provides sufficient force on movable brake shoe 63 to actually bend support line 2, as shown in FIG. 12. As such, the weight of cable 7 pulling on overlash jig 1 when in the position shown in FIG. 12, is overcome not only by the frictional engagement between support line 2, fixed brake shoe 35 and movable brake shoe 63, but also by the bending and thus locking engagement between support line 2 and brake shoes 35 and 63.

Figure 13:
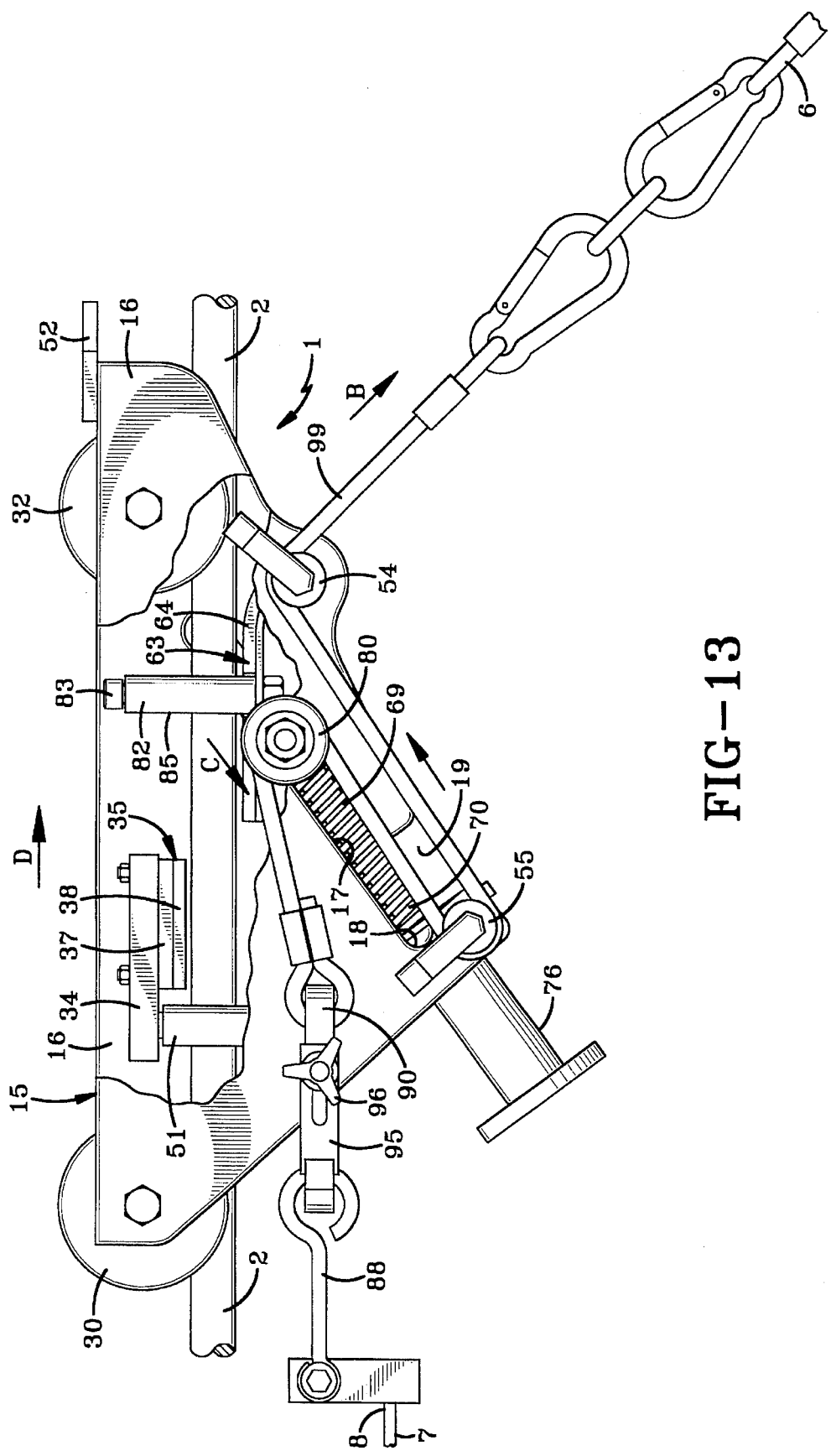
FIG. 13 is a side elevational view of the overlash jig with portions cut away and shown supported from and being towed along the support line.

Once overlash jig 1 has been maneuvered around the obstacle, such as a utility pole, and reinstalled on support line 2, vehicle 5 (FIG. 1) will be moved in direction A applying force on tow cable 6 and consequently on rope 99 along the direction shown by arrow B in FIG. 13. Force in this direction, via the circuitous route of rope 99, will apply a downward force on pulley 80, thereby overcoming coil spring 70 and urging movable brake shoe 63 away from support line 2 and toward pressure plate 71, as shown by arrow C. As coil spring 70 is compressed, the force applied thereon increases, but coil spring 70 will not expand as pressure plate 71 is held in position via the interaction between arms 73 and respective recesses 18. Once sufficient force has been applied to cable 99 via the movement of vehicle 5, movable brake shoe 63 will disengage support line 2, as shown specifically in FIG. 13. Such disengagement will cause support line 2 to assume a linear configuration and permit rollers 30 and 32 of overlash jig 1 to rollingly engage support line 2, and thus pull cable 7 in the direction of arrow D.

Figure 14:
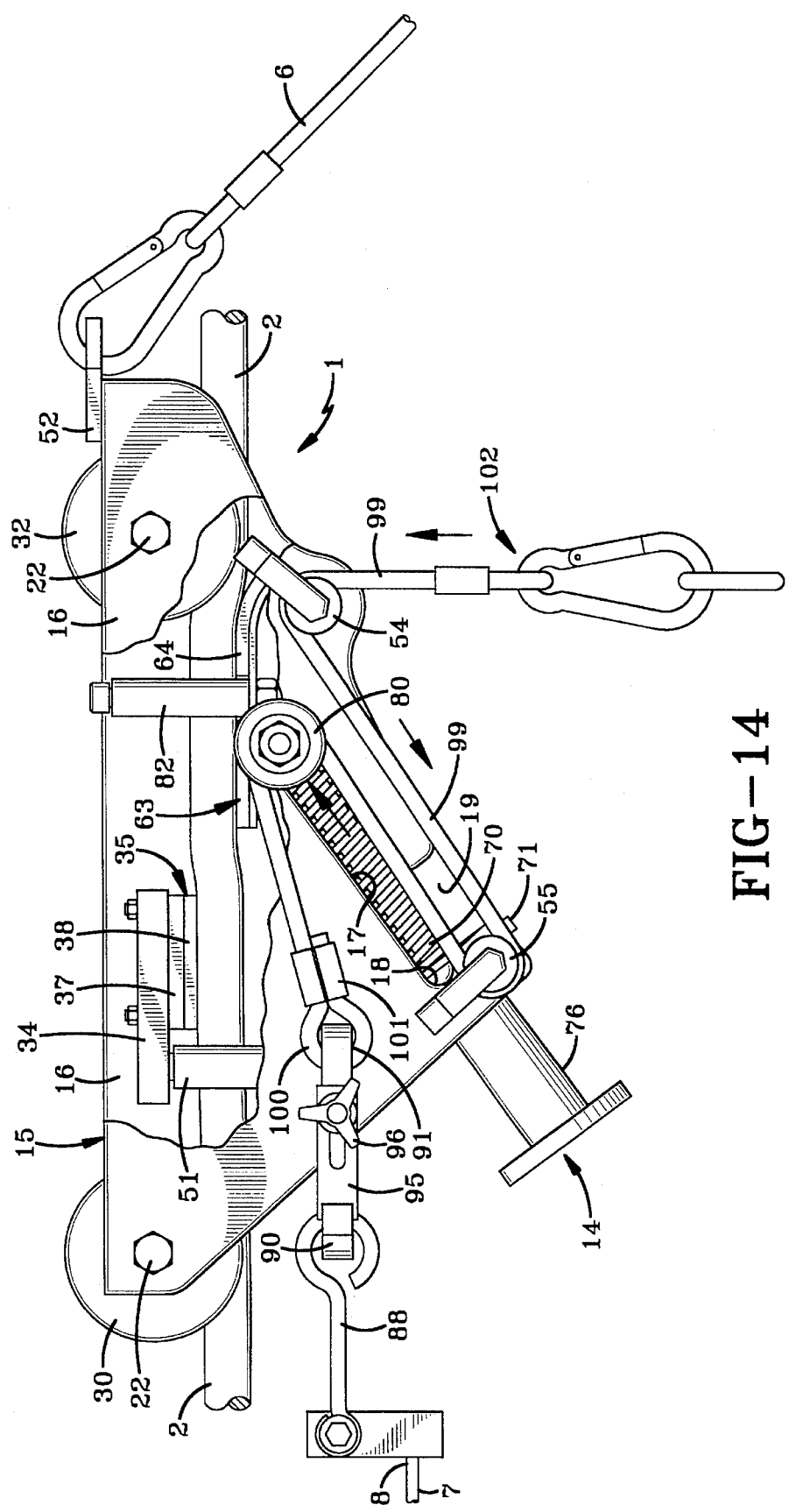
FIG. 14 is a side elevational view of the overlash jig with portions cut away and shown with the brake engaging the cable, and with the tow line attached to the body of the jig.
Figure 15:
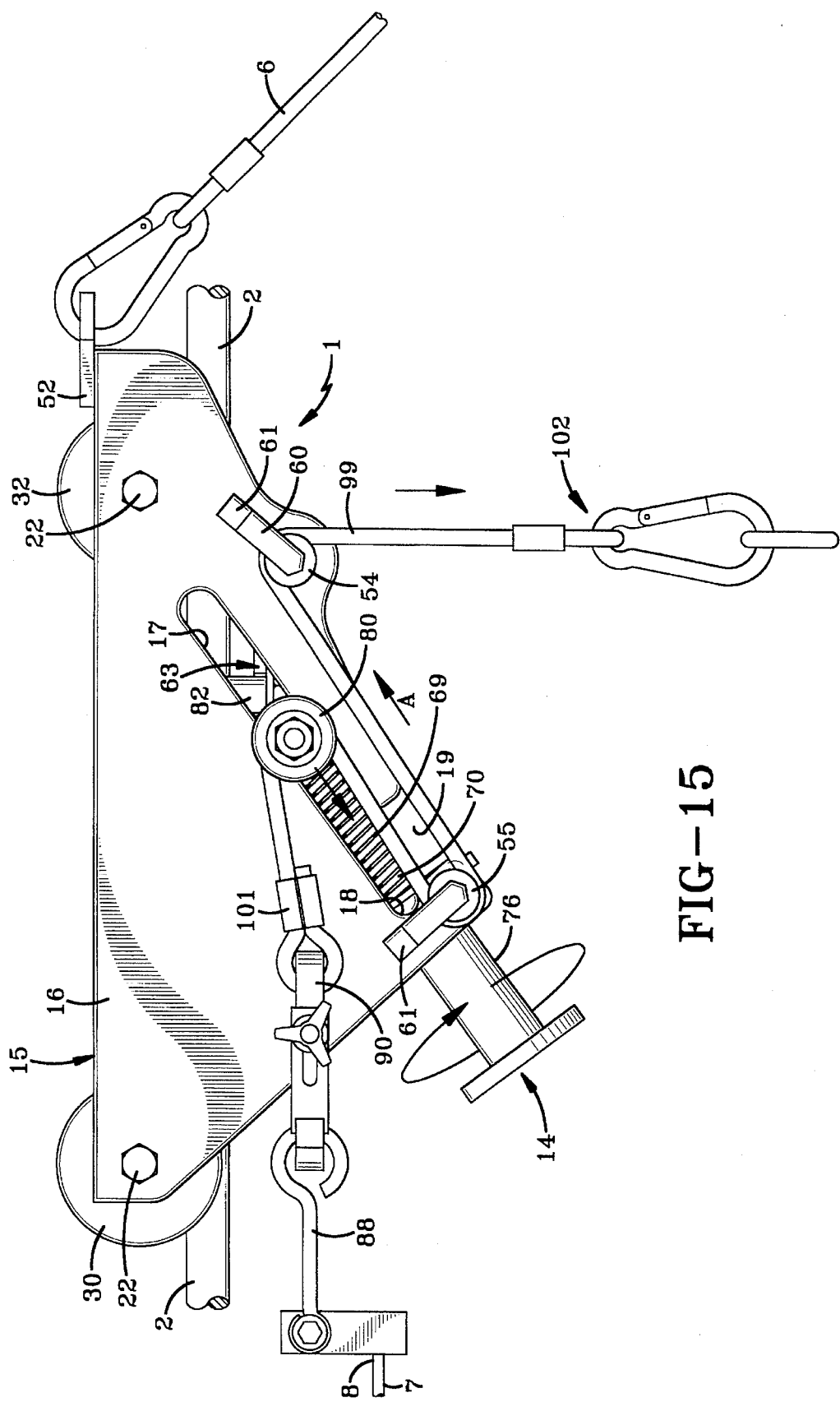
FIG. 15 is a side elevational view of the overlash jig shown supported from a support cable, with a tow cable attached to the body of the overlash jig, and shown with the manual brake release in a first partially removed position.

Once the next obstacle, such as a utility pole, is reached, the overlash jig resumes the position shown in FIG. 12. The method by which the overlash jig is maneuvered around the obstacle without introducing slack into cable 7 is now described. When the motion of vehicle 5 has stopped and tow line 6 is slack, overlash jig 1 assumes the position shown in FIG. 12 as described above. Thereafter, tow line 6 is disconnected from rope 99, and reconnected to overlash jig 1 by inserting a clip on the end thereof through hole 53 of tow plate 52, as shown specifically in FIG. 14. When this occurs, the rope 99 will be slack, and fixed brake shoe 35 and movable brake shoe 63 will engage support line 2 as discussed above with respect to FIG. 12. Tension is then reapplied to tow rope 6, sufficient to prevent overlash jig 1 and cable 7 from retreating along support line 2 when movable brake shoe 63 is released. In order to release movable brake shoe 63, handle 76 is rotated in a clockwise direction (FIG. 15), causing nut 75 to threadably engage bolt 69. This threading engagement moves pressure plate 71 toward movable brake shoe 63 (arrow A), decreasing the distance extending therebetween, and consequently compressing coil spring 70. As the effective length of coil spring 70 is decreased, movable brake shoe 63 is disengaged from support line 2, and overlash jig 1 is held in position via the tension applied to tow rope 6.

Figure 16:
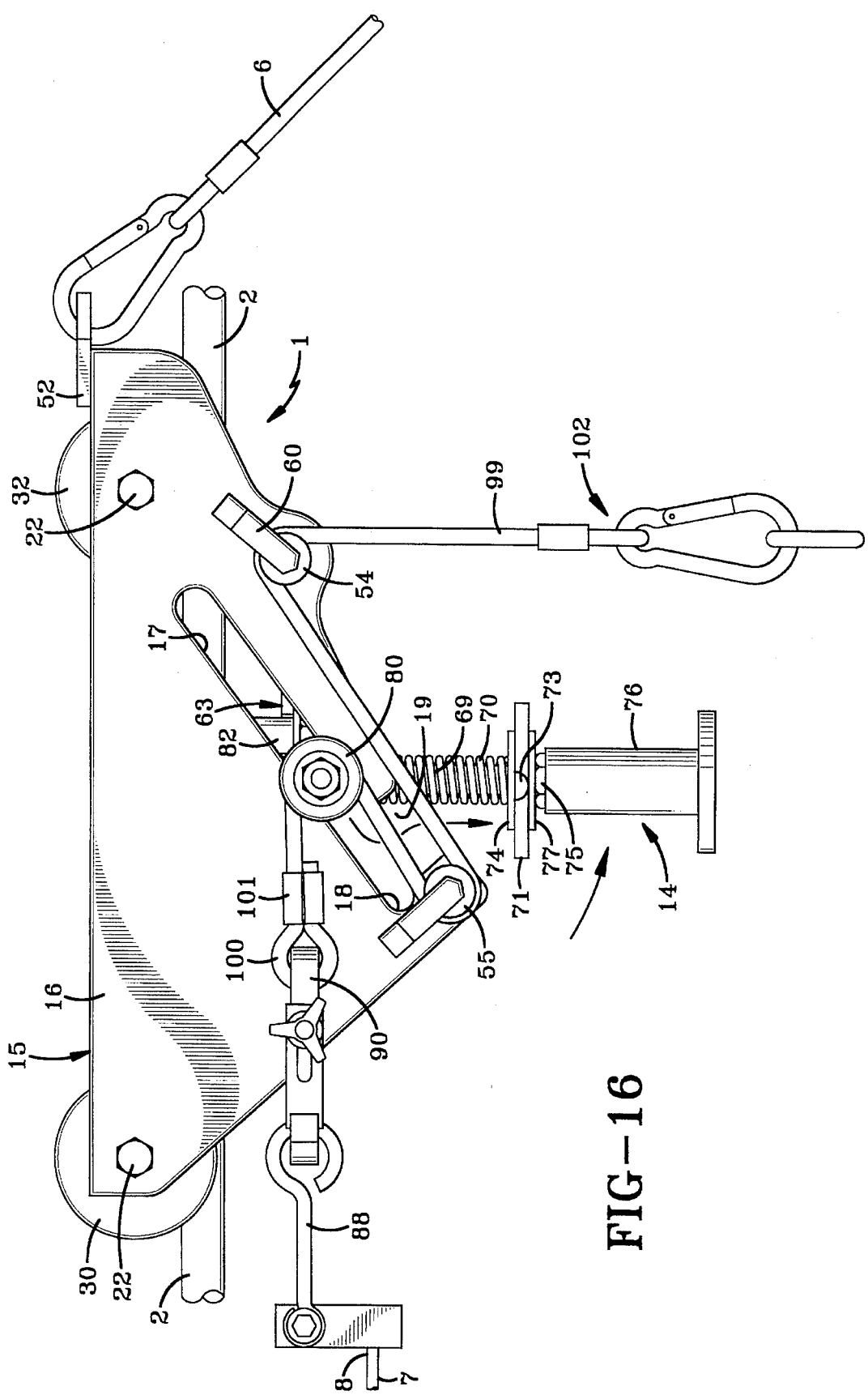
FIG. 16 is a side elevational view of the overlash jig shown supported from a support cable, with a tow cable attached to the body of the overlash jig, and shown with the manual brake release in a second partially removed position.

Referring to FIG. 16, once coil spring 70 is sufficiently compressed, arms 63 may be moved upwardly toward support line 2 and out of engagement with respective recesses 18 such that they will rotate outwardly through respective openings 19. Thereafter, ropes 99 may be disengaged from respective pulleys 80, and the entire manual brake release 14 may be removed by also passing pin 62 through openings 19.

Figure 17:
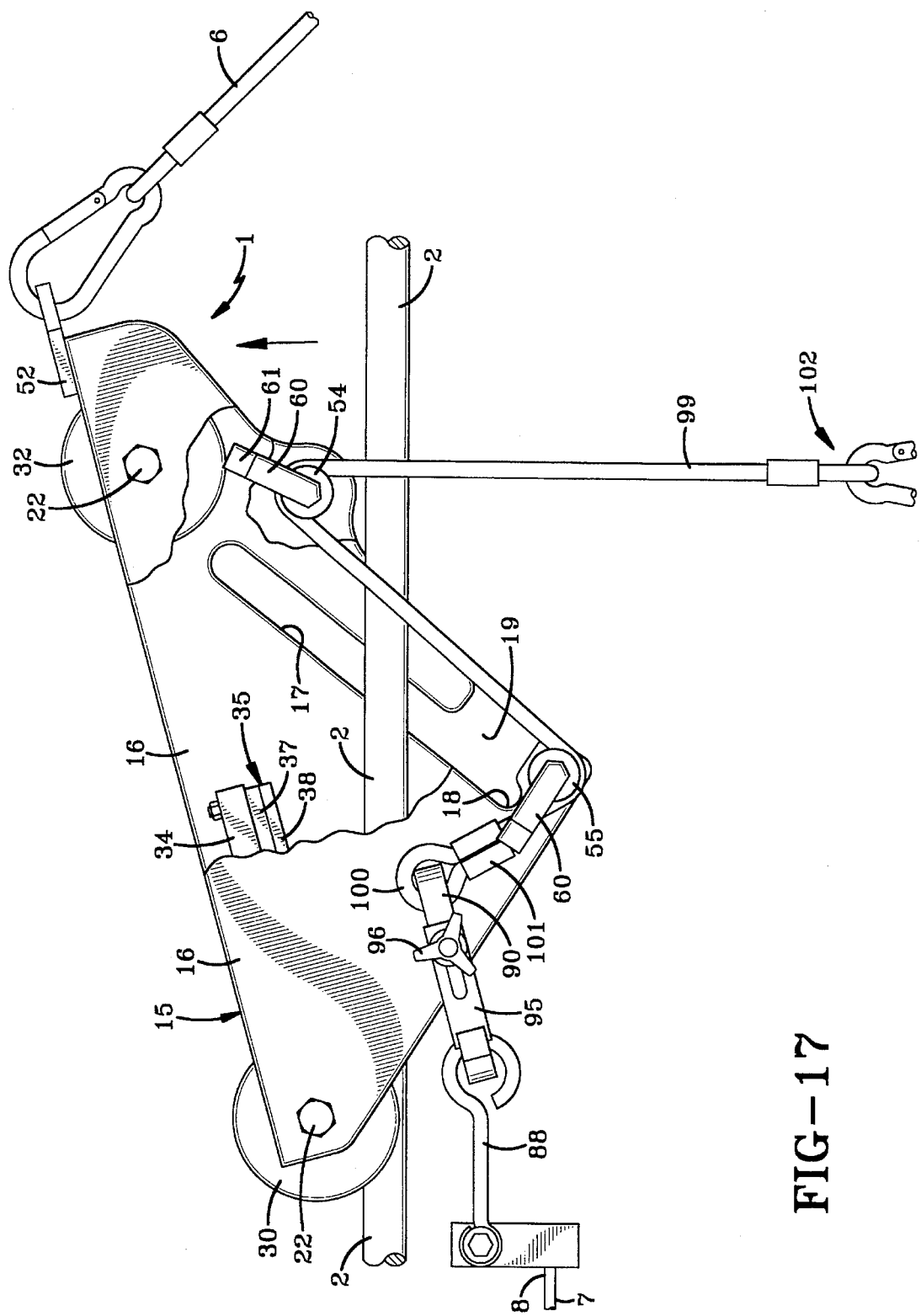
FIG. 17 is a side elevational view of the overlash jig shown with portions cut away and with a tow cable attached to the body of the overlash jig, with the manual brake release removed, and with the overlash jig partially removed from the support line.

Thereafter, overlash jig 1 may be removed from support line 2 via the opening created by the removal of manual brake release 14 (FIG. 17). Inasmuch as tension is constantly applied to overlash jig 1 via tow cable 6, the jig may be easily maneuvered around the obstacle, and repositioned on support line 2. Pin 62 then is inserted through openings 19 and subsequently into guide slots 17 until arms 73 pass through respective openings 19. Thereafter, handle 76 is rotated in a counterclockwise direction until arms 73 seat in recesses 18 permitting coil spring 70 to expand and apply pressure against support line 2. Thereafter, tow rope 6 is detached from hole 53 in tow plate 52 and reconnected to ropes 99, as shown in FIG. 12.

In order to assure that sufficient pressure is held on support line 2 when brake shoes 35 and 63 engage support line 2, and further to assure that when manual brake release 14 is operated, the coil spring 70 may be reduced to a size sufficient to permit the removal of manual brake release 14 from the body of overlash jig 1. When support line 2 is in the range of from 0.25 inch to 0.65 inch in diameter, a 5.75 inch length spring is utilized. Similarly, when support line 2 has a diameter ranging from 0.65 inch to 1 inch, a 5 inch spring is utilized, and when support line 2 is in the range of from 1 inch to 1.5 inches, a 3.5 inch spring is utilized. In this manner, when support line 2 is larger, a smaller length spring is utilized to assure that when the spring is compressed, manual brake release 14 may still be removed from the body of overlash jig 1 while simultaneously assuring that spring 70 provides sufficient force on movable brake shoe 63 to retain the body of overlash jig 1 in position via the frictional engagement of support line 2, fixed brake shoe 35 and movable brake shoe 63.

Regardless of the position of overlash jig 1, rear cable guides 36 and front cable guides 82 operate to rollingly engage support line 2 as overlash jig 1 is pulled therealong. Cable guides 36 and 82 assure that the cable is positioned relatively in the center of fixed brake shoe 35 and movable brake shoe 63, respectively, and also to assure that the force acting on support line 2 via coil spring 70 operates generally through the center of the cable to reduce torque on movable brake shoe 63.

One of the primary benefits of the above-described overlash jig is that when the overlash jig is being pulled along the support line, for example, in the position shown in FIGS. 12–13, support line 2 is effectively locked between respective slide plates 16, fixed brake shoe 35 and movable brake shoe 63. Overlash jig 1 cannot inadvertently be pulled off of support line 2 as it is towed therealong, thereby creating a safe environment for those working with overlash jig 1.

In summary, overlash jig 1 includes an automatic brake which is applied when tension is removed from tow line 6, and consequently from rope 99, preventing overlash jig 1 from retreating along support line 2 and introducing slack into cable 7. Such braking occurs as a result of frictional engagement between stationary brake shoe 35, movable shoe 63, and support line 2. Also, since fixed brake shoe 35 is offset from movable brake shoe 63, support line 2 is bent when braking force is applied via coil spring 70. Overlash jig 1 also includes manual brake release 14 which releases pressure on movable brake shoe 63, and consequently reduces frictional engagement between brake shoe 63 and support line 2. This is accomplished via the rotation of handle 76 which moves pressure plate 71 toward movable brake shoe 63, compressing coil spring 70.

Overlash jig 1 also maintains tension on tow rope 6, and consequently on overlash jig 1, to prevent overlash jig 1 from retreating along support line 2 and introducing slack into cable 7. This is accomplished while simultaneously assuring that support line 2 cannot accidentally slip out of overlash jig 1 as it is pulled therealong, substantially increasing the safety and effectiveness of overlash jig 1.

Accordingly, the improved overlash jig is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved overlash jig is constructed and used, the characteristics of the construction, and the advantageous, new and useful results obtained; the new and useful structures, devices, elements, arrangements, parts and combinations, are set forth in the appended claims.

I claim:

1. An overlash jig adapted to rollingly engage a support line for pulling a cable along said support line, said overlash jig comprising:

a body including a pair of plates;

a plurality of rollers carried by said body between the plates;

a fixed brake shoe carried by said body;

a movable brake shoe spaced apart from said fixed brake shoe and positioned to secure the support line between the plates, the rollers and movable brake shoe;

spring means for biasing said movable brake shoe toward the support line when passing between said movable brake shoe and said fixed brake shoe;

manual brake release means for overcoming said spring means and for moving said movable brake shoe away from the cable; and brake operating means for overcoming said spring bias means and positively moving said movable brake shoe away from the support line when a cable is being pulled along the support line.

2. The overlash jig as defined in claim 1 in which the body further includes a front end and a rear end; in which one roller of the plurality of rollers is mounted adjacent each end; and in which the fixed brake shoe is mounted between the plates intermediate the rollers.

3. The overlash jig as defined in claim 1 in which said spring means is a compression coil spring.

4. An overlash jig adapted to rollingly engage a support line for pulling a cable along said support line, said overlash jig comprising:

a body having a pair of plates, a front end, a rear end and a longitudinal axis;

a plurality of rollers rotatably mounted between the plates whereby one roller of a plurality of rollers is mounted adjacent each end;

a fixed brake shoe mounted between the plates and intermediate the rollers;

a movable brake shoe spaced apart from said fixed brake shoe and offset from said fixed brake shoe and from said rollers relative to said longitudinal axis;

spring means for biasing said movable brake shoe toward the support line when passing between said movable brake shoe and said fixed brake shoe;

manual brake release means for overcoming said spring means and for moving said movable brake shoe away from the cable; and brake operating means for overcoming said spring bias means and moving said movable brake shoe away from the support line when a cable is being pulled along the support line.

5. An overlash jig adapted to rollingly engage a support line for pulling a cable along said support line, said overlash jig comprising:

a body;

a plurality of rollers carried by said body;

a fixed brake shoe carried by said body;

a movable brake shoe spaced apart from said fixed brake shoe;

spring means for biasing said movable brake shoe toward the support line when passing between said movable brake shoe and said fixed brake shoe;

manual brake release means for overcoming said spring means and for moving said movable brake shoe away from the cable;

brake operating means for overcoming said spring bias means and moving said movable brake shoe away from the support line when a cable is being pulled along the support line; and a plurality of spaced apart cable guides mounted intermediate the plates for receiving the support line therebetween.

6. The overlash jig as defined in claim 5 in which each of said cable guides includes a pin, and a roller rotatably mounted on each of said pins for rotatably engaging the support line.

7. The overlash jig as defined in claim 6 in which the cable guides include a first pair of cable guides mounted adjacent said stationary brake shoe, and a second pair of cable guides mounted adjacent said movable brake shoe.

8. An overlash jig adapted to rollingly engage a support line for pulling a cable along said support line, said overlash jig comprising:

a body;

a plurality of rollers carried by said body;

a fixed brake shoe carried by said body;

a movable brake shoe spaced apart from said fixed brake shoe;

a coil spring for biasing said movable brake shoe toward the support line when passing between said movable brake shoe and said fixed brake shoe;

manual brake release means for overcoming said coil spring and for moving said movable brake shoe away from the cable whereby the manual brake release means includes a threaded bolt attached to said movable brake shoe and extending through the coil spring for applying pressure to said movable brake shoe, and a pressure plate slidably mounted on said bolt whereby a compression means engages said bolt for applying pressure to said pressure plate and thereby compressing said coil spring between said pressure plate and said movable brake shoe; and brake operating means for overcoming said spring bias means and moving said movable brake shoe away from the support line when a cable is being pulled along the support line.

9. The overlash jig as defined in claim 8 in which said compression means includes a nut threadably engaging said threaded bolt such that said pressure plate is interposed between said nut and said coil spring, and a hand wheel for rotating said nut.

10. The overlash jig as defined in claim 9 in which the pressure plate is formed with a pair of arms; in which the body includes a pair of parallel and spaced-apart plates; in which each of said plates is formed with an upper recess; and in which said arms are seated in said upper recess to prevent movement of said pressure plate downwardly along said bolt when said overlash jig is installed on the support line so as to prestress the coil spring.

11. The overlash jig as defined in claim 10 in which each of said plates is formed with a guide slot; in which a guide pin is attached to said movable brake shoe and said bolt; and in which said guide pin extends into each of said guide slots.

12. The overlash jig as defined in claim 11 in which said guide slot and said recess each communicate with an opening formed in each of said plates; and in which said arms and said guide pin pass through said opening to remove said manual brake release means from said body.

13. The overlash jig as defined in claim 12 in which at least one of said bolts and movable brake shoe is rotatably mounted on said guide pin.

14. The overlash jig as defined in claim 11 in which said brake operating means includes attachment means for attaching a tow cable to said body, and includes spring compression means for compressing said coil spring when force is applied to the tow cable.

15. The overlash jig as defined in claim 14 in which the guide pin includes a pair of ends; in which a movable pulley is attached to each of the guide pin ends, adjacent each of said plates; in which a first fixed pulley is mounted to each of said plates; and in which a pair of flexible linear members are attached to said body and travel a circuitous route around said movable pulleys and said first fixed pulleys for connecting to the tow rope.

16. The overlash jig as defined in claim 15 in which a second fixed pulley is attached to each of said plates; and in which said flexible linear member extends around each of said second pulleys.

17. The overlash jig as defined in claim 15 in which said guide pin is slidably received within the guide slots such that movement of said flexible linear member about each of said fixed pulleys causes said movably pulleys and the attached guide pin to slide downwardly within the guide slots toward said pressure plate.

18. The overlash jig as defined in claim 17 including a cable harness latch means for securing the cable to said overlash jig.

19. The overlash jig as defined in claim 18 in which the cable harness latch means is formed with a hook-shaped recess and a gate slidably mounted adjacent said hook-shaped recess for movement between an open position and a closed position.

20. An overlash jig adapted to rollingly engage a support line for pulling a cable along said support line, said overlash jig comprising:

a body;

a plurality of rollers carried by said body;

a fixed brake shoe carried by said body and releasably mounted on said body;

a movable brake shoe spaced apart from said fixed brake shoe and releasably mounted on said body;

spring means for biasing said movable brake shoe toward the support line when passing between said movable brake shoe and said fixed brake shoe;

manual brake release means for overcoming said spring means and for moving said movable brake shoe away from the cable; and brake operating means for overcoming said spring bias means and moving said movable brake shoe away from the support line when a cable is being pulled along the support line.

21. The overlash jig as defined in claim 20 in which said fixed brake shoe and said movable brake shoe each includes a base plate and a brake pad; in which said base plates are formed with a plurality of apertures; in which each aperture of the plurality of apertures has a countersunk portion; in which the apertures and countersunk portions receive liquid adhesive; and in which said liquid adhesive forms a rivet in said aperture and said countersunk portion to adhesively attach said brake pads to said base plates.

* * * * *